(12) United States Patent
Koyfman et al.

(10) Patent No.: US 12,627,506 B2
(45) Date of Patent: May 12, 2026

(54) CREATING LANGUAGE INDEPENDENT CRYPTO ASSETS

(71) Applicant: International Business Machines Corporation, Armonk, NY (US)

(72) Inventors: Anatoly Koyfman, Kiriat Yam (IL); Micha Gideon Moffie, Zichron Yaakov (IL); Eyal Bin, Haifa (IL); Omer Yehuda Boehm, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 18/786,731

(22) Filed: Jul. 29, 2024

(65) Prior Publication Data

US 2026/0032002 A1     Jan. 29, 2026

(51) Int. Cl.
| | |
|---|---|
| *G06F 21/00* | (2013.01) |
| *G06F 8/41* | (2018.01) |
| *G06F 21/57* | (2013.01) |
| *H04L 9/32* | (2006.01) |

(52) U.S. Cl.
CPC ........... *H04L 9/3249* (2013.01); *G06F 8/427* (2013.01); *G06F 21/577* (2013.01)

(58) Field of Classification Search
CPC ....... H04L 9/3249; G06F 8/427; G06F 21/577
See application file for complete search history.

(56) References Cited

U.S. PATENT DOCUMENTS

| | | | |
|---|---|---|---|
| 8,397,300 B2 | 3/2013 | Tripp | |
| 12,153,686 B1 * | 11/2024 | Matrosov | .............. G06F 21/577 |

| | | | | |
|---|---|---|---|---|
| 2021/0232695 | A1 * | 7/2021 | Eldefrawy | ............ G06F 21/602 |
| 2023/0359744 | A1 * | 11/2023 | Duggan | .................... G06F 8/65 |
| 2024/0113869 | A1 * | 4/2024 | Trost | ..................... H04L 9/0852 |
| 2024/0354408 | A1 * | 10/2024 | Mooney, III | .......... G06F 21/563 |
| 2025/0005163 | A1 * | 1/2025 | Rooney | ..................... H04L 9/40 |
| 2025/0150466 | A1 * | 5/2025 | Miles | .................. H04L 63/1433 |
| 2025/0165251 | A1 * | 5/2025 | Palanki | ..................... G06F 8/75 |

(Continued)

FOREIGN PATENT DOCUMENTS

| | | |
|---|---|---|
| CN | 104484607 A | 4/2015 |

OTHER PUBLICATIONS

US 11,924,236 B1, 03/2024, Mathews et al. (withdrawn)

(Continued)

*Primary Examiner* — William A Corum, Jr.
(74) *Attorney, Agent, or Firm* — CANTOR COLBURN LLP; Anthony Mauricio Pallone

(57) ABSTRACT

Mechanisms are provided for generating a cryptographic asset bill of materials of a source code. The mechanisms generate flow graph of the source code and execute a parsing and analyzing the source code based on a cryptographic asset knowledge base to identify an initial set of cryptographic artifacts referenced in the source code. The mechanisms execute, for each cryptographic asset in the initial set of cryptographic artifacts, a flow graph analysis to identify one or more dependent cryptographic artifacts to form sets of related cryptographic artifacts. In addition, the mechanisms generate, for each set of related cryptographic artifacts, a cryptographic asset, compile the generated cryptographic assets into a cryptographic bill of materials, and generate and output a report of the cryptographic bill of materials.

18 Claims, 5 Drawing Sheets

(56)          References Cited

U.S. PATENT DOCUMENTS

2025/0300812 A1\*    9/2025    Azouaoui ............. H04L 9/3268

OTHER PUBLICATIONS

"CodeQL", GitHub, https://codeql.github.com/, accessed online Jun. 26, 2024, 5 pages.
"Cryptobom-Forge Library", https://github.com/Santandersecurityresearch/cryptobom-forge/blob/dev/cbom/resources/library.yml, accessed online Jun. 26, 2024, 4 pages.
Afrose, Sharmin et al., "Evaluation of Static Vulnerability Detection Tools With Java Cryptographic API Benchmarks", IEEE Transactions on Software Engineering (vol. 49, Issue: 2, Feb. 1, 2023), Feb. 25, 2022, 12 pages.
Braga, Alexandre et al., "Understanding How to Use Static Analysis Tools for Detecting Cryptography Misuse in Software", IEEE Transactions on Reliability, vol. 69, No. 4, Dec. 2019, published Oct. 9, 2019, 20 pages.
Cho, Jihoon et al., "Software-Defined Cryptography: A Design Feature of Cryptographic Agility", arXiv:2404.01808v1 [cs.CR], Apr. 2, 2024, 8 pages.
Cuthbert, Daniel et al., "The Magnetic Pull of Mutable Protection: Worked Examples in Cryptographic Agility", Blackhat—Europe 2023, https://www.blackhat.com/eu-23/briefings/schedule/index.html#the-magnetic-pull-of-mutable-protection-worked-examples-in-cryptographic-agility-36030, Dec. 6, 2023, 49 pages.

El-Qawas, Emile et al., "Cryptobom-Forge", GitHub, https://github.com/Santandersecurityresearch/cryptobom-forge/tree/dev, accessed online Jun. 26, 2024, 7 pages.
Feichtner, Johannes et al., "Automated Binary Analysis on iOS—A Case Study on Cryptographic Misuse in iOS Applications", WiSec '18: Proceedings of the 11th ACM Conference on Security & Privacy in Wireless and Mobile Networks, Jun. 18, 2018, 12 pages.
Hess, Basil, "Cryptography Bill of Materials", GitHub, Apr. 9, 2024, 8 pages.
Li, Wenqing et al., "CryptoGo: Automatic Detection of Go Cryptographic API Misuses", Proceedings of the 38th Annual Computer Security Applications Conference (ACSAC'22), Dec. 5-9, 2022, 14 pages.
Pisarev, I.A., "C# parser for extracting cryptographic protocols structure from source code", Trudy ISP RAN/Proc. ISP RAS, vol. 31, issue 3, Sep. 1, 2019, 6 pages.
Rahaman, Sazzadur et al., "SPANL: Creating Algorithms for Automatic API Misuse Detection with Program Analysis Compositions", In: Zhou, J., et al. Applied Cryptography and Network Security Workshops. ACNS 2023. Lecture Notes in Computer Science, vol. 13907, Springer, Published online Oct. 4, 2023, 16 pages.
Rodrigues, Gustavo E. et al., "A machine learning approach to detect misuse of cryptographic APIs in source code", Brazilian Symposium on Information and Computational Systems Security (SBSeg), Oct. 13, 2020, 14 pages.
Sun, Cong et al., "CryptoEval: Evaluating the risk of cryptographic misuses in Android apps with data-flow analysis", The Institution of Engineering and Technology, Wiley Online Library, IET Information Security, vol. 17, Issue 4, Jul. 2023, 16 pages.

\* cited by examiner

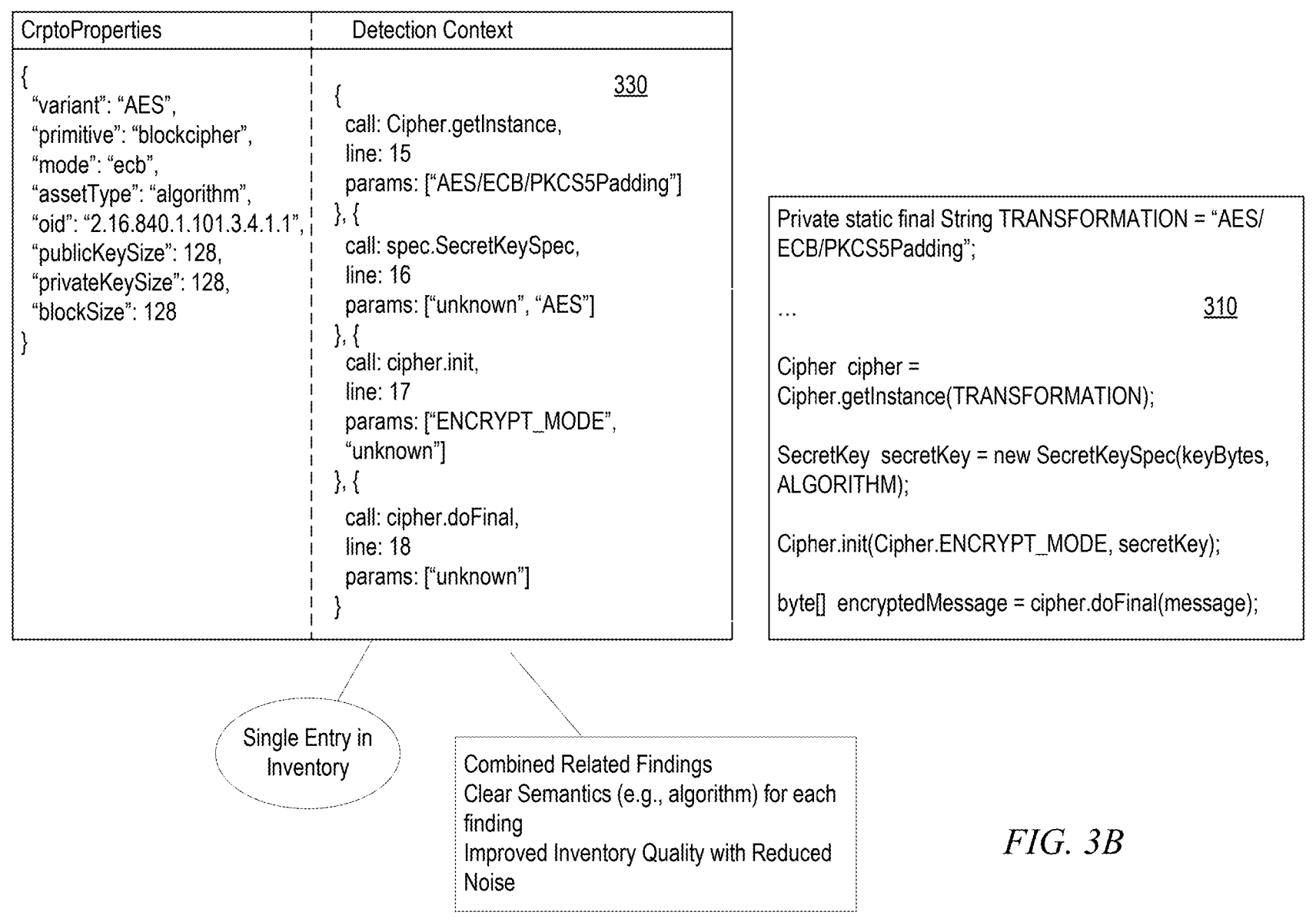

```
Private static final String TRANSFORMATION = "AES/
ECB/PKCS5Padding";

...                                              310

Cipher cipher =
Cipher.getInstance(TRANSFORMATION);

SecretKey secretKey = new SecretKeySpec(keyBytes,
ALGORITHM);

Cipher.init(Cipher.ENCRYPT_MODE, secretKey);

byte[] encryptedMessage = cipher.doFinal(message);
```

| CrptoProperties | Detection Context |
|---|---|
| | 330 |
| { | { |
| "variant": "AES", | call: Cipher.getInstance, |
| "primitive": "blockcipher", | line: 15 |
| "mode": "ecb", | params: ["AES/ECB/PKCS5Padding"] |
| "assetType": "algorithm", | }, { |
| "oid": "2.16.840.1.101.3.4.1.1", | call: spec.SecretKeySpec, |
| "publicKeySize": 128, | line: 16 |
| "privateKeySize": 128, | params: ["unknown", "AES"] |
| "blockSize": 128 | }, { |
| } | call: cipher.init, |
| | line: 17 |
| | params: ["ENCRYPT_MODE", "unknown"] |
| | }, { |
| | call: cipher.doFinal, |
| | line: 18 |
| | params: ["unknown"] |
| | } |

Single Entry in Inventory

Combined Related Findings
Clear Semantics (e.g., algorithm) for each finding
Improved Inventory Quality with Reduced Noise

*FIG. 3B*

CREATING LANGUAGE INDEPENDENT CRYPTO ASSETS

BACKGROUND

The present application relates generally to an improved data processing apparatus and method and more specifically to an improved computing tool and improved computing tool operations/functionality for creating language independent crypto assets from source code.

Cryptographic agility refers to the ability of a system or organization to adapt and evolve its cryptographic methods and protocols in response to changing security needs and threats. This means that the system or organization is able to upgrade, replace or modify its cryptographic algorithms, key lengths, and protocols in a timely and efficient manner. The need for cryptographic agility arises because cryptographic algorithms and protocols typically become outdated and vulnerable to attacks over time, while new cryptographic techniques and standards are developed to address these vulnerabilities. Organizations supporting cryptographic agility can respond to such changes quickly and effectively and maintain the security and confidentiality of their data and communications.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for generating a cryptographic asset bill of materials of a source code. The method comprises generating at least one flow graph of the source code and executing a parsing and analyzing of the source code based on a cryptographic asset knowledge base to identify an initial set of cryptographic artifacts referenced in the source code. The method further comprises executing, for each cryptographic asset in the initial set of cryptographic artifacts, at least one flow graph analysis, based on the at least one flow graph, to identify one or more dependent cryptographic artifacts and form sets of related cryptographic artifacts. Moreover, the method comprises generating, for each set of related cryptographic artifacts, a cryptographic asset and compiling the generated cryptographic assets into a cryptographic bill of materials. The method further comprises generating and outputting a report of the cryptographic bill of materials.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 3A-3B provide example diagrams illustrating a portion of source code and the resulting cryptographic assets generated by the language independent CAID tool in accordance with one illustrative embodiment.

DETAILED DESCRIPTION

Figure 1:
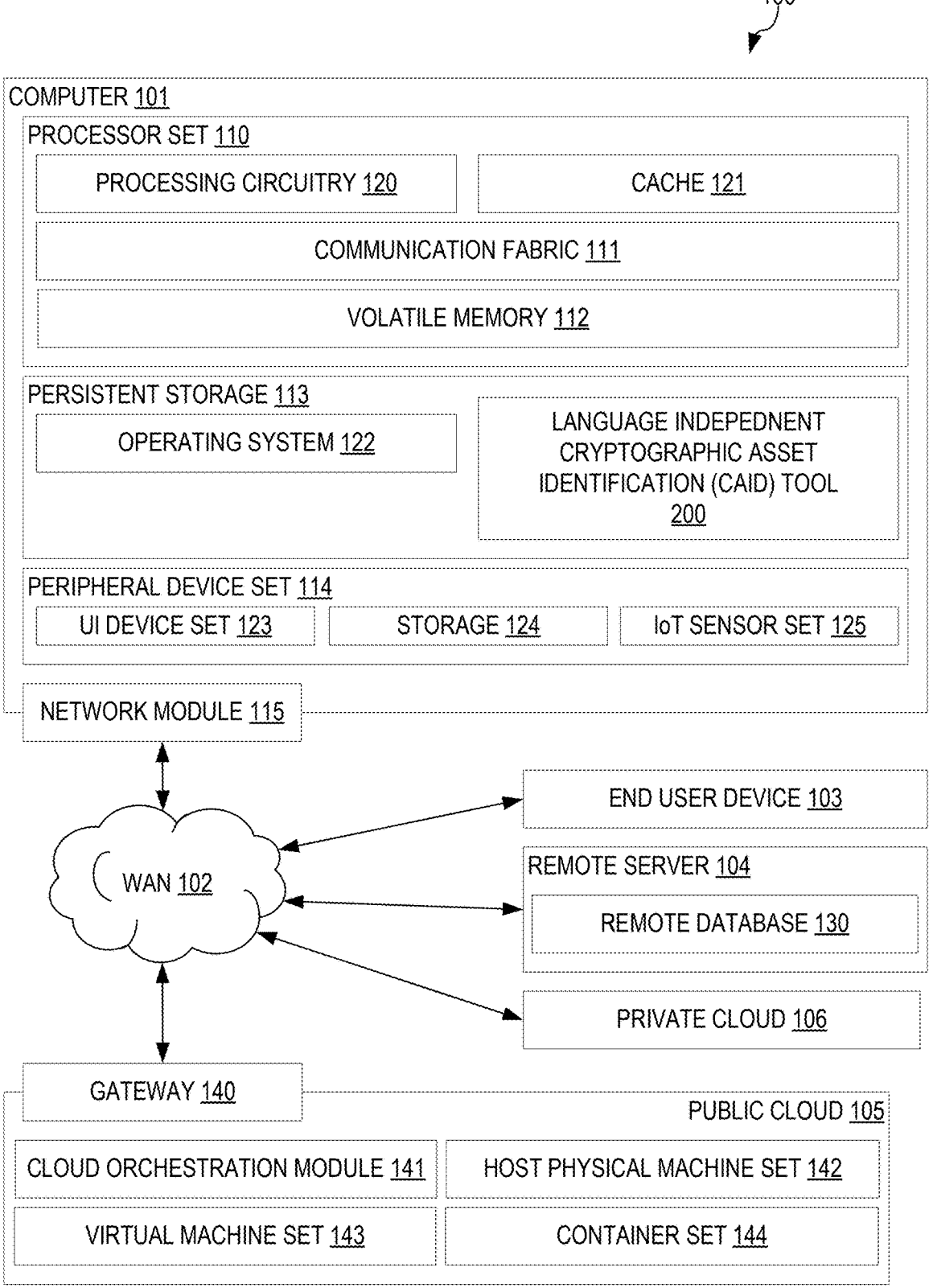
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for creating language independent crypto assets from source code. The improved computing tool and improved computing tool operations/functionality may operate to generate a cryptographic inventory of such crypto assets, and thereby provide a basis for performing subsequent cryptographic agility operations including, but not limited to, enforcing a secure cryptographic policy across an information technology (IT) infrastructure of an organization, reacting quickly to security issues, and efficiently carrying out strategic application modernization, such as migrating cryptographic services to cloud systems or migrating to different service and infrastructure providers.

The illustrative embodiments are directed to solving problems associated with identifying the realization of cryptographic operations in source code of a computing infrastructure of an organization. The illustrative embodiments provide an improved computing tool and improved computing tool operations/functionality that automatically identifies cryptographic assets (crypto assets) within the source code and generates a cryptographic inventory, or cryptographic bill of materials (CBOM), for the source code. A cryptographic asset, or crypto asset, is a data structure that represents a complete cryptographic operation, such as encryption or signing. The crypto asset comprises all the variables and functions involved in a cryptographic operation, where these variables and functions are referred to as a crypto context. A crypto asset is defined in terms of crypto properties and related materials. A crypto property is a descriptive property of the cryptographical operation (crypto asset), such as an algorithm name, key size, cryptographic function performed, and the like. Related materials are additional data items used for the cryptographical operation, e.g., the actual secret key (e.g., content of 32 bytes that are utilized as secret key), an initialization vector (e.g., content of 16 bytes used as the initialization vector), a randomizer value, or the like. A crypto artifact is a source code element, e.g., a function call and variables, that is associated with a cryptographical operation.

The illustrative embodiments provide mechanisms to extract comprehensive descriptions of the usage of cryptography in source code. The mechanisms perform an enhanced static analysis, e.g., data and control flow, value tracing, and slicing, of the source code. The results of the static analysis are used to extract the details of the usage of cryptography in a programming language independent manner. The discovered usage of cryptography is reported in pure cryptographical terms, i.e., programming language independent terms, and scanned for the known weaknesses and misuses of cryptography. Programming language dependent information is modeled in one or more external knowledge bases using a schema that allows for the programming language independent operations of the illustrative embodiments.

The following description provides examples of embodiments of the present disclosure, and variations and substitutions may be made in other embodiments. Several examples will now be provided to further clarify various aspects of the present disclosure.

Example 1: A computer-implemented method for generating a cryptographic asset bill of materials of a source code. The method comprises generating at least one flow graph of the source code and executing a parsing and analyzing of the source code based on a cryptographic asset knowledge base to identify an initial set of cryptographic artifacts referenced in the source code. The method further comprises executing, for each cryptographic asset in the initial set of cryptographic artifacts, at least one flow graph analysis, based on the at least one flow graph, to identify one or more dependent cryptographic artifacts and form sets of related cryptographic artifacts. The method also comprises generating, for each set of related cryptographic artifacts, a cryptographic asset and compiling the generated cryptographic assets into a cryptographic bill of materials. Moreover, the method comprises generating and outputting a report of the cryptographic bill of materials. The above limitations advantageously enable the identification of related cryptographical artifacts and their contexts in a programming language independent manner based on a cryptographic asset knowledge base, and the generation of a cryptographic bill of materials that may inform organizations of their cryptographic assets, which they may have not previously been aware of. This is a distinct improvement over existing systems in that the invention combines cryptographic artifacts in an intelligent manner based on detected relationships between the cryptographic artifacts.

Example 2: The limitations of any of Examples 1 and 3-10, where the cryptographic asset knowledge base comprises a plurality of programming language independent cryptographic function models. The above limitations advantageously enable the identification of cryptographic artifacts and cryptographic assets from source code in a manner that is independent of the particular programming language of the source code. Moreover, the above limitations advantageously enable the specification of the cryptographic assets in a cryptographic domain manner that is independent of programming languages.

Example 3: The limitations of any of Examples 1-2 and 4-10, where the programming language independent cryptographic function models comprise models for at least one of a cryptographic library, cryptographic application programming interface (API) call, or cryptographic domain relevant keywords. The above limitations advantageously enable programming language independent identification of portions of source code corresponding to cryptographic library calls, cryptographic API calls, or other portions of source code that have cryptographic domain semantics.

Example 4: The limitations of any of Examples 1-3 and 5-10, where the parsing and analyzing of the source code comprises scanning the at least one flow graph based on cryptographic artifact search terms provided in the cryptographic asset knowledge base to identify portions of the at least one flow graph matching one or more of the cryptographic artifact search terms, and adding the identified portions as cryptographic artifacts in the initial set of cryptographic artifacts. The above limitations advantageously enable the searching of flow graphs for cryptographic artifacts in a manner that is programming language independent using search terms specific to cryptographic artifacts of cryptographic assets, as specified in a cryptographic asset knowledge base.

Example 5: The limitations of any of Examples 1-4 and 6-10, where executing the parsing and analyzing of the source code comprises identifying a final cryptographic operation in the source code and performing a backward parsing and analysis operation from the final cryptographic operation to other operations that contribute to parameters of the final cryptographic operation. The above limitations advantageously enable the identification of cryptographic artifacts of source code that are related to one another such that they can be combined into a single cryptographic asset.

Example 6: The limitations of any of Examples 1-5 and 7-10, where the at least one flow graph comprises a control flow graph and a data flow graph, and wherein executing the at least one flow graph analysis comprises executing a control flow analysis combined with data dependency analysis, based on the control flow graph and data flow graph, to identify the one or more dependent cryptographic artifacts. The above limitations advantageously enable the identification of related cryptographic assets based on control flows and data dependencies to determine which cryptographic artifacts contribute to a final cryptographic operation and can therefore be combined into a single cryptographic asset.

Example 7: The limitations of any of Examples 1-6 and 8-10 where executing the at least one flow graph analysis comprises: performing a backward traversal of the control flow graph from a final cryptographic operation to identify instances of cryptographical artifacts connected through data dependencies to the final cryptographic operation; for identified instances of cryptographical artifacts comprising program variables, determining a set of constant values that the variables can be assigned with using a data flow analysis; and for identified instances of cryptographical artifacts comprising function calls, tracing back the function argument definitions by performing a reaching definitions data flow analysis. The above limitations advantageously enable a backward traversal of high level flow graph representations of source code from a final cryptographic operation to identify cryptographic artifacts comprising program variables and cryptographic artifacts comprising function calls that are related to one another.

Example 8: The limitations of any of claims 1-7 and 9-10 where generating, for each set of related cryptographic artifacts, a cryptographic asset comprises: filtering the set of related cryptographic artifacts to identify a subset of one or more cryptographic artifacts that have cryptographic semantics; and generating the cryptographic asset based on the subset of cryptographic artifacts, in the set of related cryptographic artifacts, that are not filtered out by the filtering operation. The above limitations advantageously enable the selective inclusion of cryptographic artifacts into cryptographic assets such that those artifacts that do not contribute to the final cryptographic operation of the cryptographic asset can be removed.

Example 9: The limitations of any of claims 1-8 and 10 where the method further comprises executing at least one of a computer executed rules engine or trained machine learning computer model, configured to identify cryptographic vulnerabilities or weaknesses in cryptographic assets, on the cryptographic bill of materials to identify one or more vulnerabilities or weaknesses in the cryptographic bill of materials; and automatically executing a cryptographic agility operation based on the one or more identified vulnerabilities or weaknesses in the cryptographic bill of materials. The above limitations advantageously enable the identification of cryptographic weaknesses and/or vulnerabilities and automatically execute cryptographic agility operations to address these identified vulnerabilities and/or weaknesses.

Example 10: The limitations of any of claims 1-9 where the cryptographic asset knowledge base comprises data structures that map language dependent details of cryptographic assets to language agnostic properties in a cryptographic domain. The above limitations advantageously enable the language independent identification of cryptographic assets such that cryptographic assets may be identified from source code regardless of the particular programming languages in which the source code is programmed.

Example 11: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with response to Examples 1-10.

Example 12: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

In accordance with one or more of the illustrative embodiments, an improved computing tool and improved computing tool operations/functionality are provided that comprise automated computer logic to slice source code into portions corresponding to cryptographic (crypto) assets using a cryptographic asset (CA) knowledge base (CAKB) and then perform cryptographic asset analytics on the slices to identify sub-portions of each slice that correspond to a cryptographic asset based on the modeling of cryptographic assets set forth in the CAKB. The resulting cryptographic assets may then be compiled into a CBOM for the source code which can then serve as a basis for performing cryptographic agility related computer operations. In this way, an organization is informed of their cryptographic assets, some of which they may not be aware of, such as those existing in non-standardized source code generated by individuals associated with the organization. In some illustrative embodiments, rules may be executed on, or analysis may then be performed on, these cryptographic assets to ensure that they meet security requirements, are up-to-date, do not represent security vulnerabilities, are in conformance with compliance requirements, and the like.

The automated identification of cryptographic assets, and the defining of the cryptographic assets in the cryptographic inventory or CBOM is programming language independent and is not based on predefined patterns of cryptographic application programming interface (API) calls. That is, the CAKB is language independent and thus, the source code may be in any suitable programming language and the mechanisms of the illustrative embodiments will still be able to identify the cryptographic assets using language independent cryptographic function modeling set forth in the CAKB. Moreover, whereas some mechanisms may operate on predefined patterns of API calls to identify cryptographic functions, and thus are limited to these predefined patterns, the illustrative embodiments operate to identify cryptographic assets in a more versatile manner that is not limited to predefined patterns. Thus, where pattern based mechanisms require maintenance to update patterns to support new patterns of API calls, the illustrative embodiments do not require such maintenance and may be automatically adapted to any new patterns of cryptographic function invocations. Moreover, pattern based mechanisms tend to be language dependent and thus, additional maintenance and effort is required to ensure support for multiple different programming languages, whereas the present invention is language independent.

The illustrative embodiments implement a static scanning algorithm which is able to identify semantic use and context of cryptographic algorithms and protocols and produce a cryptographic bill of materials (CBOM) using cryptographic specifications. In some illustrative embodiments, the static scan tool of the illustrative embodiments may be built on an existing static analysis tool, e.g., the CodeQL static scanner, available from GitHub, which is modified and adapted by the mechanisms of the illustrative embodiments to specifically identify semantic use of cryptographic algorithms and protocols. CodeQL is a tool that allows users to query code represented in a relational database and can generate an abstract syntax tree, bindings, and type information as well as data and control flows for a given source code. CodeQL supports most common programming languages, however queries are language specific. CodeQL uses regular expressions and a simple keyword search to match algorithm names which are encoded in a structure. While some illustrative embodiments may be adaptations and modifications of CodeQL, the illustrative embodiments are not limited to such and any suitable static analysis tool that operates on source code may be used and adapted in accordance with the illustrative embodiments without departing from the spirit and scope of the present invention.

The invention, in accordance with some illustrative embodiments, may build on an existing static analysis tool, such as the CodeQL tool, to specifically adapt the static analysis tool to provide a cryptographic static analysis tool that not only identifies cryptographic algorithms and protocols, but to determine which cryptographic functions are irrelevant and which are relevant to the generation of a cryptographic asset. The cryptographic static analysis tool is adapted by the mechanisms of the illustrative embodiments to find a final cryptographic operation and perform, a backward parsing algorithm to identify portions of the source code that contribute to the final cryptographic operation. In so doing, the cryptographic static analysis tool is adapted to identify parameters of cryptographic functions that are marked as "value only" and trace back these parameters to the first function call that modifies these parameters and not progress further in the backward parsing and tracing. Moreover, the cryptographic static analysis tool further is adapted to remove subtrees of abstract syntax trees of the source code that do not contain cryptographic functions.

The cryptographic static scan tool accepts either source code, bytecode or native binary files as an input, and operates to document and record cryptographic evidence in the source code. Implementing cryptographic algorithms and protocols often depends on a very precise choice of functions/methods and parameters that are supplied in calls to cryptographic libraries, which may depend on non-local inputs such as configuration files or configuration databases. Moreover, arguments for calls to cryptographic functions sometimes depend on other parts of the source code which are in completely different parts of the application.

The illustrative embodiments accept a package of source code and potentially its dependent libraries. The illustrative embodiments parse the source code, the configuration files, and the dependencies (information specifying which portions of code are dependent upon each other) to construct high level representations of the program (source code), e.g., an abstract syntax tree, a control flow graph, a call graph, etc. which can be used as a basis for later cryptographic asset identification analyses. The generation of the abstract syntax tree, control flow graph, and call graph may be performed in a manner generally known in the art and thus, a more detailed description of this aspect of the present invention is not described in greater detail herein.

The illustrative embodiments implement the cryptographic static analysis tool to scan these high level representations of the program (source code) for cryptographically significant artifacts. The scan may be based on cryptographic artifact search terms provided in the cryptographic asset knowledge base (CAKB). For example, in some illustrative embodiments, the CAKB may contain known cryptographic libraries, cryptographic API calls, known Public Key Infrastructure (PKI) domain relevant keywords, or other cryptographic keywords. Alternatively, in some illustrative embodiments, a rule-based model or a trained machine learning model can classify or predict such significant cryptographic artifacts from the given source code.

Once the initial set of cryptographic artifacts are identified, the invention can iteratively find data dependent artifacts using control flow analysis combined with data dependency analysis. In the case where the identified cryptographic artifacts are program variables, the scanner of the illustrative embodiments can evaluate the set of potential constant values (accounting for each possible path) that the variable can be assigned with, using data flow analysis for constant values. In the case where the identified artifacts are function calls, the scanner can trace back the function's argument definitions, e.g., performing a reaching definitions data flow analysis. The result is a set of functions and variables that are semantically related. This process may be repeated iteratively over the newly collected dependent functions and variables until all dependencies have been resolved.

Thereafter, the illustrative embodiments filter the dependent functions, or artifacts, to identify those functions and arguments that have cryptographic semantics and collaboratively perform a cryptographic operation or represent a cryptographic asset (e.g. filter the functions to identify functions that are part of the cryptographic API). Once this process completes, the result set contains all the calls that were needed to execute the cryptographic asset (cryptographic operation) such as an encryption algorithm that uses a cipher instantiation method, a cipher initialization method, secret keys generation methods, and the actual encryption operation method. Similarly, a signature algorithm will include an instantiation, a signature schema selection, keys and random numbers of preparations, and the actual sign or verify operations. Once the process above of collecting all the dependent evidence is complete, an aggregated set of related cryptographic properties for each cryptographic or dependent artifact can be generated. Once the scanner collects all the information internally, it can express the various results, i.e., crypto assets, using various types of reports, e.g., a cryptographic inventory or CBOM.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides mechanisms for automatically identifying, in a language independent manner, cryptographic assets in source code. The improved computing tool implements mechanism and functionality, such as an automated language independent cryptographic asset inventory computing tool, which cannot be practically performed by human beings either outside of, or with the assistance of, a technical environment, such as a mental process or the like. The improved computing tool provides a practical application of the methodology at least in that the improved computing tool is able to identify cryptographic assets from source code and generate a cryptographic inventory or cryptographic bill of materials (CBOM) for the source code upon which cryptographic agility operations may be performed.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as language independent cryptographic asset identification (CAID) tool 200, where the CAID tool 200 may be implemented as software stored in a memory and executed by one or more processors to thereby specifically configure the processors to perform the operations of the CAID tool 200, as hardware/firmware in which the CAID tool 200 operations are performed by the hardware/firmware itself, or any combination of software and/or hardware/firmware. For purposes of illustration, it will be assumed in the description of the illustrative embodiments that the CAID tool 200 is implemented as software executed by one or more processors of one or more computing devices.

In addition to CAID tool 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and CAID tool 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in CAID tool 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in CAID tool 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102.

Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a language independent cryptographic asset identification (CAID) tool 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates identification and generation of cryptographic assets from analysis of source code such that these cryptographic assets can be used as a basis for performing cryptographic agility operations.

Figure 2:
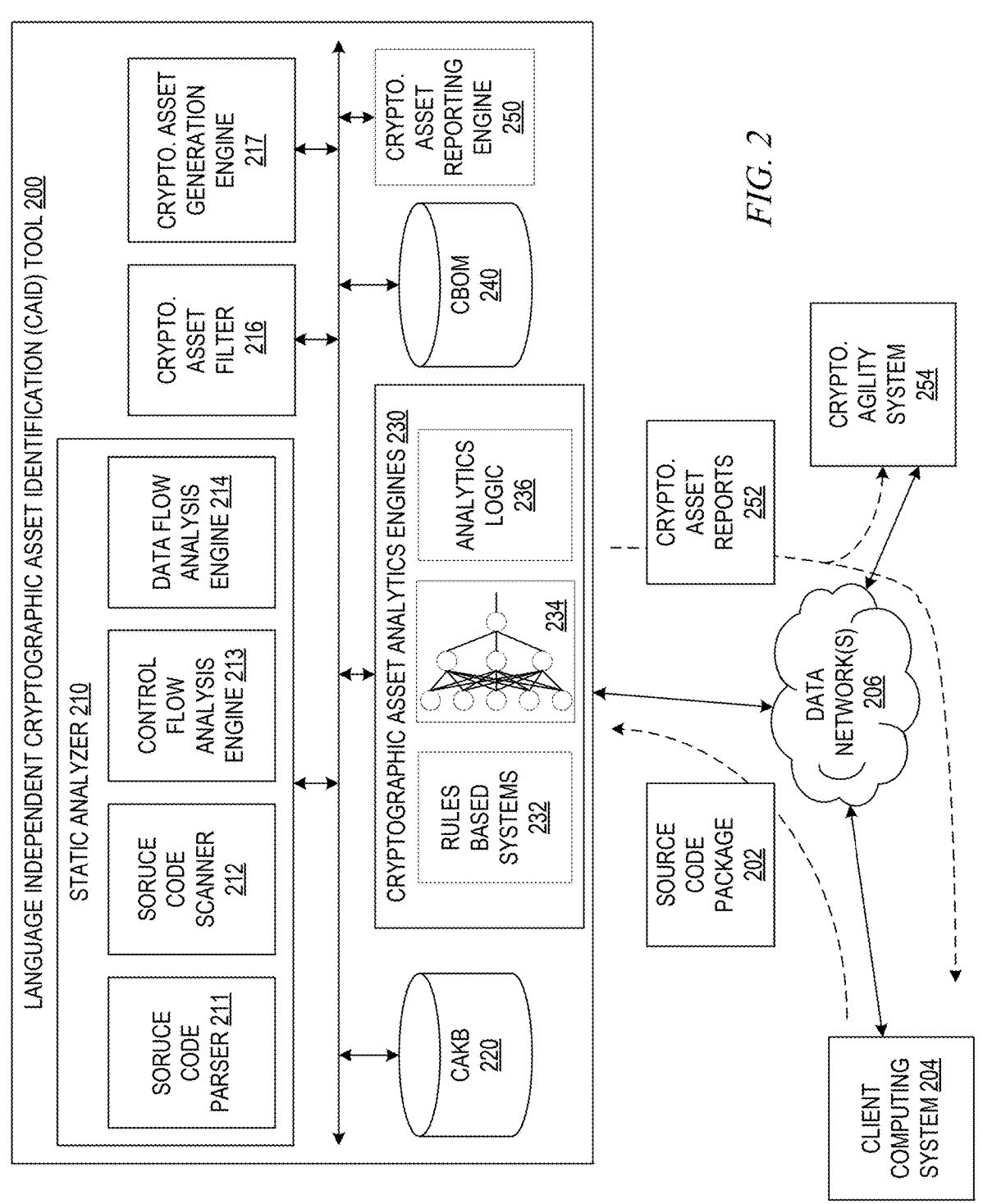
FIG. 2 is an example block diagram illustrating the primary operational components of a language independent cryptographic asset identification (CAID) tool in accordance with one illustrative embodiment.

FIG. 2 is an example block diagram illustrating the primary operational components of a language independent cryptographic asset identification (CAID) tool in accordance with one illustrative embodiment. As touched upon above, the operational components of the CAID tool, as shown in FIG. 2, may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., source code, and the resulting output may aid human beings, such as in the performance of cryptographic agility operations. The invention is specifically directed to the automatically operating computer components directed to improving the way in which cryptographic assets are automatically identified in source code, with the improved CAID tool providing a language independent and flexible approach to cryptographic asset identification that is not dependent on predefined patterns. Such operations cannot be practically performed by human beings as a mental process and is not directed to organizing any human activity.

As shown in FIG. 2, the language independent CAID tool 200 comprises an enhanced static analyzer 210, a cryptographic asset knowledge base (CAKB) 220, one or more cryptographic asset analytics engines 230, a cryptographic bill of materials (CBOM) storage 240, and cryptographic asset reporting engine 250. The enhanced static analyzer 210 comprises a source code package parser 211, a source code scanner 212, a control flow analysis engine 213, and a data flow analysis engine 214. The CAID tool 200 further includes a cryptographic asset filter 216 and a cryptographic asset generation engine 217, which may or may not be part of the enhanced static analyzer 210 and thus, are shown in FIG. 2 as separate elements.

The CAKB 220 stores the knowledge of terms, phrases, patterns, and the like, for identifying cryptographic assets in source code packages and provide the underlying information used by other logic of the CAID tool 200 to perform parsing and analysis of the source code packages, e.g., source code package 202 from client computing system 204, to identify cryptographic asset properties in the source code package 202. For example, a well-defined listing of all the properties/characteristics associated with a cryptographical asset may be generated for each cryptographical asset and stored as part of the CAKB 220. This listing may include, but is not limited to, properties such as the name of a cryptographical algorithm, width of all the related keys (e.g., private and public keys), relevant block sizes, mode of operation, type of operation (encryption, hashing, signature, etc.) and the like.

The CAKB 220 models programming language dependent information for source code using a schema that allows the CAID tool 200 to perform its operations in a programming language independent manner, e.g., modeling cryptographic functions using data structures specifying the name of the function, parameters, what each parameter means, the properties of each parameter, e.g., string, values, etc. That is, the CAKB 200 abstracts all language dependent details by mapping language specific findings into language agnostic properties in the cryptographic domain. For example, the Advanced Encryption Standard (AES) algorithm exists in multiple programming languages, and is implemented using different APIs, but each of these implementations may be modeled in the CAKB 220 in a programming language independent model of the AES algorithm. The same is true for other cryptographic technology, e.g., message digest 5 (MD5). The modeling in the CAKB 220 is not specific to any particular programming language or dependent libraries. Thus, the CAKB 220 enables the CAID tool 200 to model source code that may be in a specific programming language in a language independent manner using terminology and structures specific to the cryptographic domain.

In some illustrative embodiments, the schema of the CAKB 220 is a database schema in which, per property of a cryptographic asset, there is a listing of all possible values of that property. In addition, per cryptographical function call, the schema may specify the call's programming language, values of its relevant parameters, and list of crypto properties associated with this call, where the values of the crypto properties are specified in the per property value listing noted above. For example, this information may be of the type "javax.crypto.Cipher.getInstance, language-Java, variant=34, parameter1=PBEWithHmacSHA224AndAES_128, digest-Size=224, blockSize=512, . . . ". In addition, the schema may specify, per cryptographical function call that contains crypto materials, semantics of its parameters (parameter index and its semantics), e.g., password, salt, initialization vector, and the like. For example, this information may be of the type "javax.crypto.Cipher. Init, parameter2='private key'".

The one or more cryptographic asset analytics engines 230 may comprise computer executed rules 232, trained machine learning computer models (e.g., neural networks or the like) 234, and/or other executed computer logic 236 to analyze the cryptographic assets with regard to known weakness, misuses, compliance requirements, best practices, updates, cryptographic policies, or any other suitable criteria for cryptographic agility operations. The one or more cryptographic asset analytics engines 230 may generate results that may be reported in one or more cryptographic asset reports generated by the cryptographic asset reporting engine 250. The cryptographic asset reports may be used to generate outputs to system administrators or other authorized personnel of an organization, or may be provided to subsequent downstream computing tools that may operate on such reports automatically to implement cryptographic agility operations. For example, a new machine learning computer model, e.g., fine tuned LLM or the like, may be built and then, based on the cryptographic asset reports, an outdated insecure algorithm, e.g., DES, may be identified and automatically replaced with a modern secure one, e.g., AES.

As mentioned previously, the illustrative embodiments provide an automated computing tool comprising automated computer logic, such as in the form of the enhanced static analyzer 210, to slice source code into portions, or "slices", corresponding to cryptographic (crypto) assets using knowledge compiled into the cryptographic asset (CA) knowledge base (CAKB) 220. That is, the language independent CAID tool 200 receives, as input, a source code package 202, such as from client computing system 204 via one or more data networks 206, where the source code package 202 comprises the source code, configuration files, build scripts, and dependencies, e.g., dependent libraries. The source code package parser 211 parses the received source code package 202, e.g., the source code to be evaluated to identify cryptographic assets, configuration files, and dependencies, and constructs high level representations of the program, e.g., abstract syntax tree, control flow graph, call graph, etc., which can be used for subsequent analyses.

Having generated the high level representations of the source code package 202, the static analyzer 210 then iteratively identifies portions of the source code that comprise cryptographic artifacts that may be part of the same cryptographic assets. That is, the static analyzer 210 slices the source code into portions, or slices, that each correspond to a particular cryptographic asset by identifying semantically related cryptographic artifacts. Cryptographic properties are extracted from the identified cryptographic artifacts which are then used to build corresponding cryptographic assets.

As shown in FIG. 2, the static analyzer 210 comprises a source code scanner 212 that operates on the source code using the high level representations, e.g., control flow graph and data flow graph analysis, to identify sequences of related cryptographic application programming interface (API) calls using the knowledge stored in the CAKB 220. The source code scanner 212 may be configured to scan the source code in the source code package 202 and find instances of one or more final cryptographic operations, and then perform a backward parsing to identify portions of the source code that contribute to the final cryptographic operation. The source code scanner 212 may operate on the source code to perform a search of terms and/or patterns specified in the modeling of cryptographic artifacts, properties, and assets in the CAKB 220 and thereby identify all instances in the source code of text and values that correspond to these cryptographic artifacts, properties, and assets.

For example, in some illustrative embodiments, the CAKB 220 may contain known cryptographic libraries, cryptographic API calls, known Public Key Infrastructure (PKI) domain relevant keywords, or other cryptographic keywords. These keywords or terms may then be used as a basis for parsing and searching the source code for instances of these keywords which are marked for further analysis. The source code scanner 212 may perform the backward parse or trace the instances from a final cryptographic operation step-by-step to determine which instances contribute to parameters, values, or the like, of this final cryptographic operation and thus, are considered to be cryptographically significant artifacts. This may be done for each identified final cryptographic operation in order to identify the significant cryptographic artifacts for each final cryptographic operation. Alternatively, in some illustrative embodiments, rather than, or in addition to, using a keyword search based methodology, a rule-based model or a trained machine learning computer model can classify or predict such significant cryptographic artifacts from the given source code by identifying significant language independent cryptographic patterns in the given source code based on the specified rules and/or training of the machine learning computer model. The source code scanner 212 may mark those instances corresponding to the final cryptographic operations as a basis for backward parsing through the other identified instances, or cryptographically significant artifacts, to thereby identify which instances contribute to this final cryptographic operation.

Once the initial set of cryptographically significant artifacts are identified, program slicing is performed as follows. The invention can iteratively find data dependent artifacts using control flow analysis of the control flow analysis engine 213, combined with data dependency analysis of the data flow analysis engine 214. For example, in backward parsing from the final cryptographic operations identified in the source code, the control flow analysis engine 213 analyzes the portion of the control flow graph corresponding to the final cryptographic operation and traverses the control flow graph backward from that final cryptographic operation to identify the instances of cryptographically significant artifacts connected through the data dependencies (function call arguments and variables) corresponding to the final cryptographic operation.

In the case where an identified cryptographic artifact in the backward parsing comprises program variables, the data flow analysis engine 214 may operate to evaluate the set of potential constant values (accounting for each possible path) that the variable can be assigned with, using a data flow analysis for constant values. In the case where the identified cryptographically significant artifacts are function calls, the data flow analysis engine 214 can trace back the function's argument definitions, e.g., performing a reaching definitions data flow analysis.

The result of the operation of the components 211-214 is a set of functions and variables that are semantically related to each other in terms of cryptographic semantics. This process may be repeated iteratively, over the newly collected dependent functions and variables, until all dependencies have been resolved. This process is repeated for each final cryptographic operation identified in the source code such that sets of functions and variables that are semantically related to each other may be generated for each final cryptographic operation in the source code.

The cryptographic asset generation engine 217 operates in conjunction with the cryptographic asset filter 216 to generate a set of one or more cryptographic assets for the source code based on the results of the operation of components 211-214. That is, the cryptographic asset generation engine 217 regards each set of semantically related functions/variables as a new cryptographic (crypto) asset and packages these together as a crypto asset for the source code. Every cryptographically significant artifact of each crypto asset is used to query the CAKB 220 to identify the relevant crypto attributes and related materials. For example, the cryptographic asset properties can be extracted from the CAKB 220 table listing of properties for each of the cryptographic assets as described above with a query that specifies the name of the function and value of its parameters. The related crypto materials can be extracted from the CAKB 220 with a query that specifies the name of the function. All of the crypto attributes and related materials are composed as part of the package of the crypto asset.

In some cases, the cryptographic asset generation engine 217 may need to perform a conflict resolution between functions/variables of the same crypto asset. This conflict resolution may comprise identifying values that are closer to the "final" cryptographical function and overwriting the values that are further away. For example, if a cipher is constructed without specification of the encryption key size, such that the default value of the encryption key size is associated with this function, and then later the encryption key is a different key size passed to the cipher during initialization, the value of the key size reported by the encryption key trumps the value reported by the cipher construction. In some illustrative embodiments, determining "closer" or "further away" in this context may comprise starting with a sink node of a graph representation that corresponds to final function call that concludes the cryptographic operation, and the cryptographical property values closer in the graph to this node take precedence over the values further away in this graph. In addition, this conflict resolution may comprise overwriting generic values with specific values. For example, if a RSA algorithm is used for cryptographical activities, when there is a more specific activity, such as a signature, in the list of collected cryptographic properties, it will supersede more generic ones, such as PKE or block cipher, independently of the operation order.

The cryptographic asset filter 216 operates on each of the sets of functions/variables for each final cryptographic operation. Those functions and variables (arguments) that have cryptographic semantics and collaboratively perform a cryptographic operation or represent a cryptographic assets are maintained while those that do not have cryptographic semantics or contribute to the cryptographic operation are filtered out. That is, the cryptographic asset filter 216 operates to filter out functions that are not part of a cryptographic API.

Once this process completes, the resulting sets defining cryptographic assets contain all the calls, functions, variables, values, etc., that were needed to execute the cryptographic operation. For example, the cryptographic asset may specify an encryption algorithm that uses a cipher instantiation method, a cipher initialization method, secret keys generation methods, and the actual encryption operation method. Similarly, a cryptographic asset may specify a signature algorithm that includes an instantiation, a signature schema selection, keys and random numbers of preparations, and the actual sign or verify operations. These cryptographic assets may be stored in a cryptographic asset inventory or cryptographic bill of materials (CBOM) of the CBOM storage 240 in association with an identifier of the source code of the source code package 202.

The cryptographic assets in the CBOM storage 240 may be further processed by the one or more cryptographic asset analytics engines 230 to determine conformance or lack of conformance with requirements, weaknesses in cryptographic assets, vulnerabilities, and the like. For example, the cryptographic asset analytics engine(s) 230 may operate on the cryptographic assets of a source code package 202, as determined by the CAID tool 200, to determine cryptographic assets for which cryptographic agility operations may be performed to address identified weaknesses, compliance violations, and the like, so as to strengthen the client computing systems 204 against potential attacks or other vulnerabilities. This may involve executing rules based systems 232 having computer executed rules that look for particular criteria regarding known cryptographic weaknesses, vulnerabilities, or non-compliance. This may involve executing one or more trained machine learning computer models, such as trained neural networks or the like, 234 on the cryptographic assets to thereby classify the cryptographic assets with regard to potential weaknesses, vulnerabilities, or non-compliance. This may also involve executing other analytics logic 236 that is configured to identify cryptographic weaknesses, vulnerabilities, or non-compliance in cryptographic assets of source code for a client computing system 204.

The results of the analysis of the cryptographic asset analytics engines 230 may be reported, by the cryptographic asset reporting engine 250, along with the CBOM for the source code package 202 to the client computing system 204. That is, the cryptographic asset reporting engine 250 may generate one or more data structures, dashboards, graphical user interfaces, or the like, collectively referred to herein as cryptographic asset reports 252, that report to the client computing system 204 the CBOM generated by the CAID tool 200 so that authorized personnel of the client computing system 204 are informed of the cryptographic assets present in the source code package 202. In addition, the generated cryptographic asset reports 252 may specifically identify the weaknesses, non-compliance, and potential vulnerabilities of the source code package 202 with regard to each of these cryptographic assets in the CBOM.

In some cases, the cryptographic asset reports 252 may be provided to cryptographic agility computing system(s) 254 which may automatically perform cryptographic agility operations. The cryptographic agility operations may comprise updating cryptographic assets so as to strengthen these cryptographic assets against known weaknesses, modifying parameters or attributes to avoid vulnerabilities, adding additional cryptographic properties or artifacts to a cryptographic asset, replacing cryptographic assets with other stronger cryptographic assets, or any other suitable cryptographic agility operation. It should be appreciated that while the cryptographic agility system 254 is shown as a separate system in FIG. 2, it may in fact be part of the client computing system 204 or otherwise associated with the client computing system 204 via the one or more data networks 206.

Thus, the illustrative embodiments provide an improved computing tool and improved computing tool operations that are able to automatically identify cryptographic assets in a source code package in a programming language independent manner. The illustrative embodiments provided automated computing tools to automatically identify these cryptographic assets and report them to source code package owners, e.g., authorized personnel of organizations associated with the source code, so as to facilitate cryptographic agility operations. Moreover, in some illustrative embodiments, the improved computing tools provide cryptographic asset inventories or CBOMs upon which compliance, weakness, and vulnerability analyses may be executed so as to identify weakness, vulnerabilities, and non-compliance which may be addressed by execution of cryptographic agility operations, which may be performed automatically in some cases.

Figure 3A:
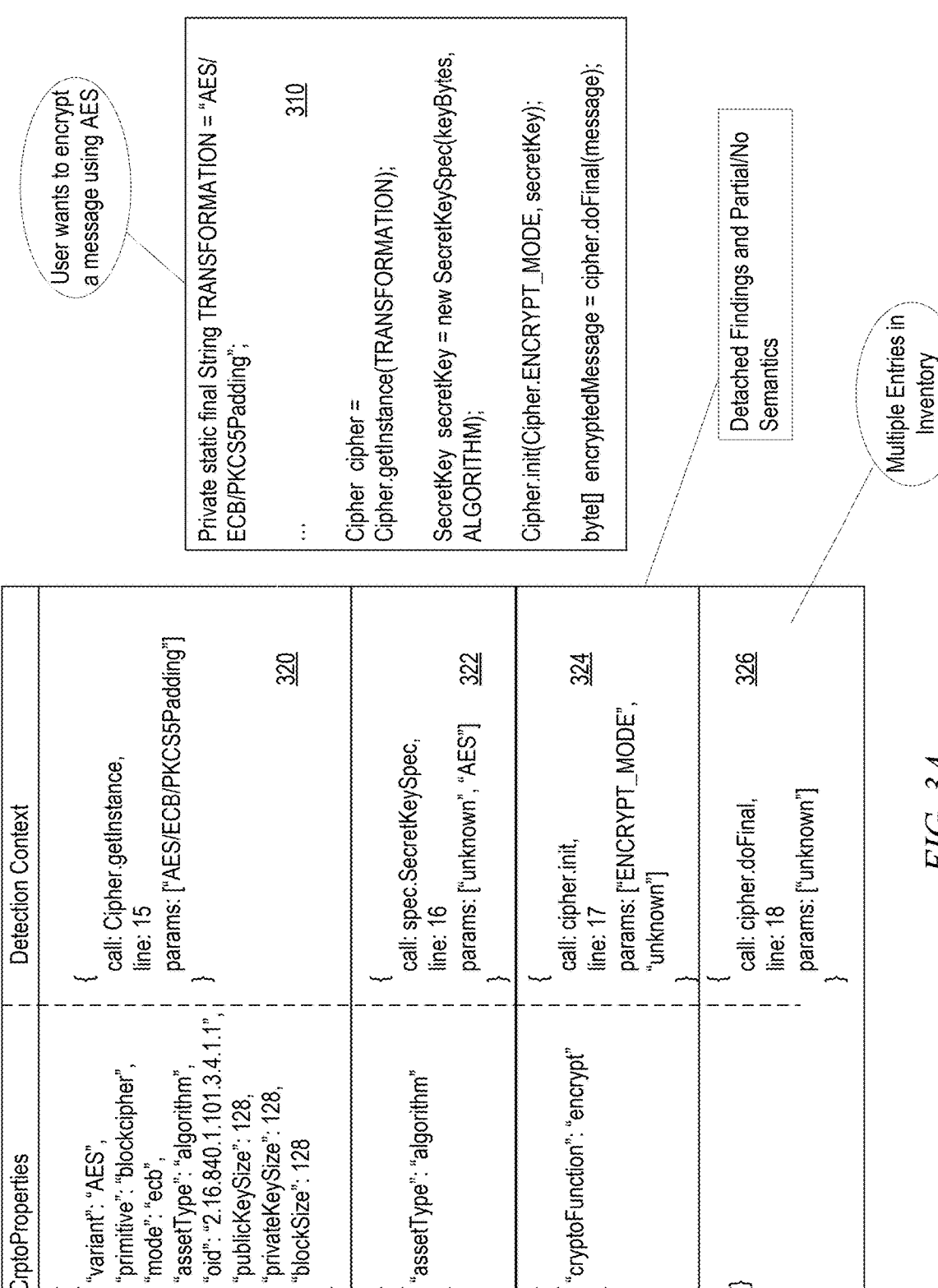

FIGS. 3A-3B provide example diagrams illustrating a portion of source code and the resulting cryptographic assets generated by the language independent CAID tool in accordance with one illustrative embodiment. As shown in FIG. 3A cryptographical functions are collected, and cryptographical properties are reported "as-is" without identifying the complete cryptographical operation. That is, as shown in FIG. 3A, a CAKB may comprise defined cryptographic function models that specify the properties and detection contexts, or related materials, for different cryptographic functions or assets. These may be matched to portions of the source code 310 to generate an inventory of cryptographic elements from the source code, e.g., cryptographic elements 320-326. In this example, the portion of source code 310 corresponds to a cryptographic asset for encrypting a message using AES. It should be noted that in this operation, the cryptographic elements 320-326 may represent findings from parsing and analyzing the portion of source code 310, but these findings are detached from one another and have only partial or no semantics.

FIG. 3B shows how related function calls are combined into a single crypto asset rather than having a listing of multiple cryptographic elements 320-326 that are detached from one another. In FIG. 3B, the lines of source code 310 shown are all related to the same crypto asset, and are collected from the data and control flow graphs provided by the static analysis tool of the illustrative embodiments. In the depicted example, the cipher.doFinal function call that concludes the encryption is first identified and then the parsing and analysis is performed backwards. Thus, for example, the cipher.doFinal function call leads to the cipher.init call through the common variable cipher. Then the backward parsing and analysis continues to both cipher.getInstance (though the variable cipher) and SecretKeySpec (though variable secretKey). Finally, the operation gets the value of the cipher.getInstance parameter through the variable TRANSFORMATION. By performing this backward traversal of parsing and analysis, the findings that are related to one another are found and combined into a single composite cryptographic asset 330 having clear semantics for each finding, specifying the crypto properties and detected context.

Figure 4:
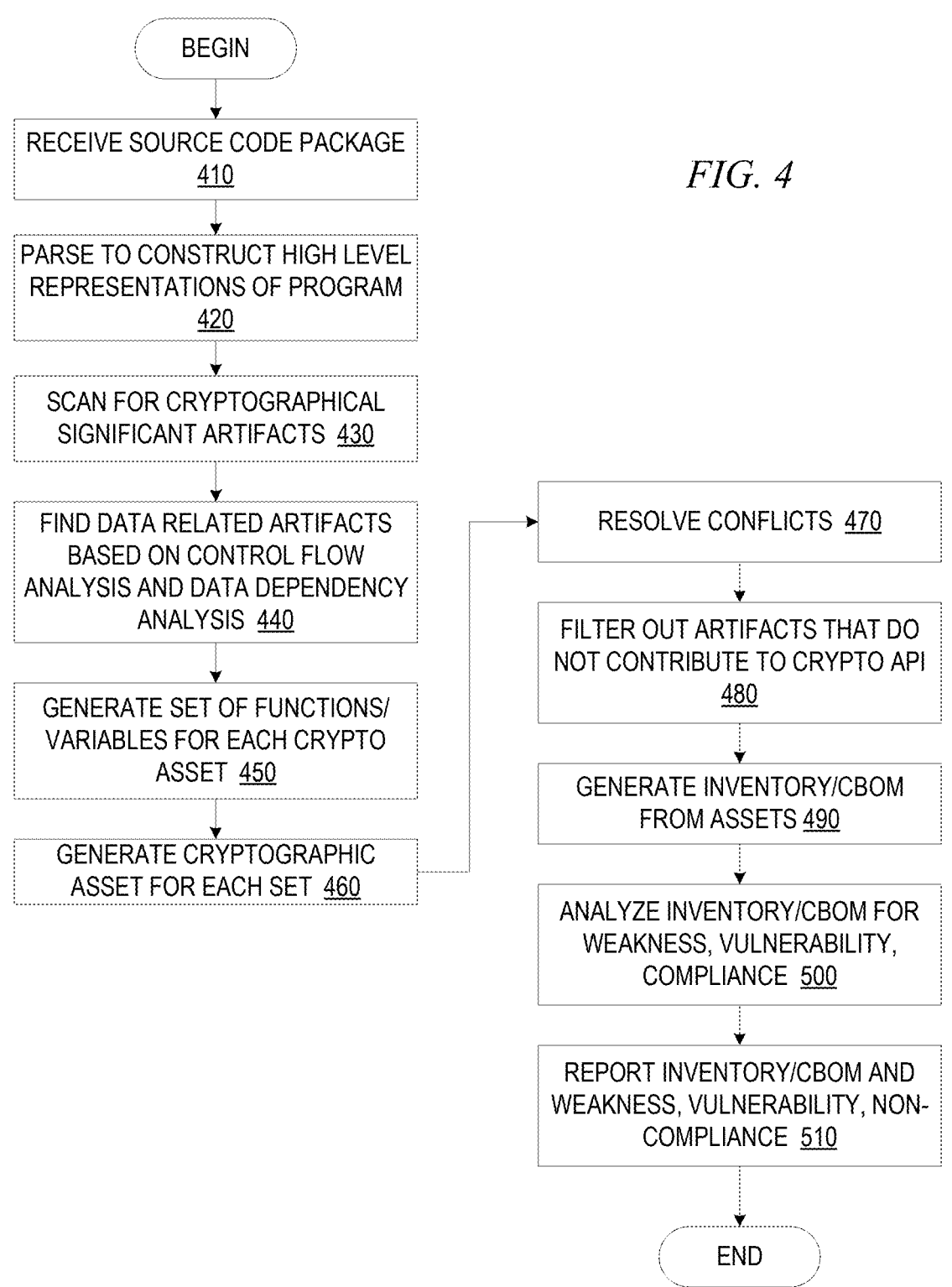
FIG. 4 presents a flowchart outlining an example operation of a language independent cryptographic asset identification tool in accordance with one or more illustrative embodiments.

FIG. 4 presents a flowchart outlining an example operation of a language independent cryptographic asset identification tool in accordance with one or more illustrative embodiments. It should be appreciated that the operations outlined in FIG. 4 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 4, and may, in some cases, make use of the results generated as a consequence of the operations set forth in FIG. 4, the operations in FIG. 4 themselves are specifically performed by the improved computing tool in an automated manner.

As shown in FIG. 4, the operation starts with the language independent CAID tool receiving a package of source code, configuration files, and dependent libraries (step 410). The source code, configuration files, and dependencies are parsed to construct high level representations of the program, e.g., an abstract syntax tree, a control flow graph, a call graph etc. which can be used as a basis for later analyses (step 420). The CAID tool scans for cryptographically significant artifacts based on, for example, search terms that can be retrieved from either a cryptographic asset knowledge base (CAKB) containing known cryptographic libraries calls, known cryptographic domain relevant keywords, or the like (step 430). Alternatively, the scanning may utilize the execution of a rule-based model, a trained machine learning model, or the like, to classify or predict such significant artifacts.

Once the initial set of artifacts are identified (step 430), scanner logic of the CAID tool iteratively finds data related artifacts using control flow analysis combined with data dependency analysis (step 440). For example, in case the identified artifacts are program variables, the scanner logic can evaluate the set of potential constant values, accounting for every possible path, that the variable can be assigned with, using data flow analysis for constant values. In cases where the identified artifacts are function calls, the scanner logic can trace back the functions' arguments definitions, e.g., using reaching definitions data flow analysis. This process should be repeated iteratively over the newly collected dependent functions and variables until all dependencies have been resolved.

The result of the identification of the initial set of artifacts and the dependent artifacts is a set of functions and variables that are semantically related to each other (step 450). The sets of artifacts are used to generate a cryptographic asset for each set (step 460) and semantically related artifacts in the cryptographic assets are processed to resolve any conflicts (step 470). The cryptographic assets may then be filtered to remove those assets that are not directed to cryptographic API operations (step 480). The cryptographic assets are then used to generate a cryptographic asset inventory or CBOM (step 490). The inventory or CBOM may be analyzed to identify weaknesses, vulnerabilities, or non-compliance (step 500). The inventory/CBOM may be reported along with any identifications of weakness, vulnerabilities, or non-compliance (step 510). In some cases, cryptographic agility operations may be performed based on the reports of inventory/CBOM. The operation terminates, but may be repeated for each source code package received.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for generating a cryptographic asset bill of materials of a source code, the method comprising:

generating at least one flow graph of the source code;

executing a parsing and analyzing of the source code based on a cryptographic asset knowledge base to identify an initial set of cryptographic artifacts referenced in the source code;

executing, for each cryptographic asset in the initial set of cryptographic artifacts, at least one flow graph analysis, based on the at least one flow graph, to identify one or more dependent cryptographic artifacts and form sets of related cryptographic artifacts;

generating, for each set of related cryptographic artifacts, a cryptographic asset;

compiling the generated cryptographic assets into a cryptographic bill of materials;

generating and outputting a report of the cryptographic bill of materials; and wherein the cryptographic asset knowledge base comprises a plurality of programming language independent cryptographic function models.

2. The method of claim 1, wherein the programming language independent cryptographic function models comprise models for at least one of a cryptographic library, cryptographic application programming interface call, or cryptographic domain relevant keywords.

3. The method of claim 1, wherein the parsing and analyzing of the source code comprises:

scanning the at least one flow graph based on cryptographic artifact search terms provided in the cryptographic asset knowledge base to identify portions of the at least one flow graph matching one or more of the cryptographic artifact search terms; and adding the identified portions as cryptographic artifacts in the initial set of cryptographic artifacts.

4. The method of claim 1, wherein executing the parsing and analyzing of the source code comprises identifying a final cryptographic operation in the source code and performing a backward parsing and analysis operation from the final cryptographic operation to other operations that contribute to parameters of the final cryptographic operation.

5. The method of claim 1, wherein the at least one flow graph comprises a control flow graph and a data flow graph, and wherein executing the at least one flow graph analysis comprises executing a control flow analysis combined with data dependency analysis, based on the control flow graph and data flow graph, to identify the one or more dependent cryptographic artifacts.

6. The method of claim 5, wherein executing the at least one flow graph analysis comprises:

performing a backward traversal of the control flow graph from a final cryptographic operation to identify instances of cryptographical artifacts connected through data dependencies to the final cryptographic operation; and for identified instances of cryptographical artifacts comprising program variables, determining a set of constant values that the program variables can be assigned with using a data flow analysis; and for identified instances of cryptographical artifacts comprising function calls, tracing back the function argument definitions by performing a reaching definitions data flow analysis.

7. The method of claim 1, wherein generating, for each set of related cryptographic artifacts, a cryptographic asset comprises:

filtering the set of related cryptographic artifacts to identify a subset of one or more cryptographic artifacts that have cryptographic semantics; and generating the cryptographic asset based on the subset of cryptographic artifacts, in the set of related cryptographic artifacts, that are not filtered out by the filtering operation.

8. The method of claim 1, further comprising:

executing at least one of a computer executed rules engine or trained machine learning computer model, configured to identify cryptographic vulnerabilities or weaknesses in cryptographic assets, on the cryptographic bill of materials to identify one or more vulnerabilities or weaknesses in the cryptographic bill of materials; and automatically executing a cryptographic agility operation based on the one or more identified vulnerabilities or weaknesses in the cryptographic bill of materials.

9. The method of claim 1, wherein the cryptographic asset knowledge base comprises data structures that map language dependent details of cryptographic assets to language agnostic properties in a cryptographic domain.

10. A computer program product comprising a computer readable storage medium having a computer readable program stored therein, wherein the computer readable program, when executed in a data processing system, causes the data processing system to:

generate at least one flow graph of the source code;

execute a parsing and analyzing of the source code based on a cryptographic asset knowledge base to identify an initial set of cryptographic artifacts referenced in the source code;

execute, for each cryptographic asset in the initial set of cryptographic artifacts, at least one flow graph analysis, based on the at least one flow graph, to identify one or more dependent cryptographic artifacts and form sets of related cryptographic artifacts;

generate, for each set of related cryptographic artifacts, a cryptographic asset;

compile the generated cryptographic assets into a cryptographic bill of materials;

generate and output a report of the cryptographic bill of materials; and wherein the cryptographic asset knowledge base comprises a plurality of programming language independent cryptographic function models.

11. The computer program product of claim 10, wherein the programming language independent cryptographic function models comprise models for at least one of a cryptographic library, cryptographic application programming interface call, or cryptographic domain relevant keywords.

12. The computer program product of claim 10, wherein the parsing and analyzing of the source code comprises:

scanning the at least one flow graph based on cryptographic artifact search terms provided in the cryptographic asset knowledge base to identify portions of the at least one flow graph matching one or more of the cryptographic artifact search terms; and adding the identified portions as cryptographic artifacts in the initial set of cryptographic artifacts.

13. The computer program product of claim 10, wherein executing the parsing and analyzing of the source code comprises identifying a final cryptographic operation in the source code and performing a backward parsing and analysis operation from the final cryptographic operation to other operations that contribute to parameters of the final cryptographic operation.

14. The computer program product of claim 10, wherein the at least one flow graph comprises a control flow graph and a data flow graph, and wherein executing the at least one flow graph analysis comprises executing a control flow analysis combined with data dependency analysis, based on the control flow graph and data flow graph, to identify the one or more dependent cryptographic artifacts.

15. The computer program product of claim 14, wherein executing the at least one flow graph analysis comprises:

performing a backward traversal of the control flow graph from a final cryptographic operation to identify instances of cryptographical artifacts connected through data dependencies to the final cryptographic operation; and for identified instances of cryptographical artifacts comprising program variables, determining a set of constant values that the program variables can be assigned with using a data flow analysis; and for identified instances of cryptographical artifacts comprising function calls, tracing back the function argument definitions by performing a reaching definitions data flow analysis.

16. The computer program product of claim 10, wherein generating, for each set of related cryptographic artifacts, a cryptographic asset comprises:

filtering the set of related cryptographic artifacts to identify a subset of one or more cryptographic artifacts that have cryptographic semantics; and generating the cryptographic asset based on the subset of cryptographic artifacts, in the set of related cryptographic artifacts, that are not filtered out by the filtering operation.

17. The computer program product of claim 10, wherein the computer readable program further causes the data processing system to:

execute at least one of a computer executed rules engine or trained machine learning computer model, configured to identify cryptographic vulnerabilities or weaknesses in cryptographic assets, on the cryptographic bill of materials to identify one or more vulnerabilities or weaknesses in the cryptographic bill of materials; and automatically execute a cryptographic agility operation based on the one or more identified vulnerabilities or weaknesses in the cryptographic bill of materials.

18. An apparatus comprising:

at least one processor; and at least one memory coupled to the at least one processor, wherein the at least one memory comprises instructions which, when executed by the at least one processor, cause the at least one processor to:

generate at least one flow graph of the source code;

execute a parsing and analyzing of the source code based on a cryptographic asset knowledge base to identify an initial set of cryptographic artifacts referenced in the source code;

execute, for each cryptographic asset in the initial set of cryptographic artifacts, at least one flow graph analysis, based on the at least one flow graph, to identify one or more dependent cryptographic artifacts and form sets of related cryptographic artifacts;

generate, for each set of related cryptographic artifacts, a cryptographic asset;

compile the generated cryptographic assets into a cryptographic bill of materials;

generate and output a report of the cryptographic bill of materials; and wherein the cryptographic asset knowledge base comprises a plurality of programming language independent cryptographic function models.

\* \* \* \* \*